United States Patent
King, Jr.

(10) Patent No.: US 8,578,554 B2
(45) Date of Patent: Nov. 12, 2013

(54) SYSTEM AND METHOD FOR CAPTURING DUST FROM POWER TOOL OPERATION

(71) Applicant: Jack Marion King, Jr., Phoenix, AZ (US)

(72) Inventor: Jack Marion King, Jr., Phoenix, AZ (US)

(73) Assignee: Skitter & Squirt, LLC, Missoula, MT (US)

( * ) Notice: Subject to any disclaimer, the term of this patent is extended or adjusted under 35 U.S.C. 154(b) by 0 days.

(21) Appl. No.: 13/691,408

(22) Filed: Nov. 30, 2012

(65) Prior Publication Data

US 2013/0087357 A1    Apr. 11, 2013

Related U.S. Application Data (63) Continuation-in-part of application No. 13/086,334, filed on Apr. 13, 2011, and a continuation-in-part of application No. 13/309,037, filed on Dec. 1, 2011.

(51) Int. Cl.
*A47L 7/00* (2006.01)
*B26D 7/18* (2006.01)
*B23B 47/34* (2006.01)

(52) U.S. Cl.
USPC ............ 15/339; 15/344; 408/67; 83/100; 83/168

(58) Field of Classification Search
USPC ........... 15/339, 344; 83/89, 100, 168; 408/67
IPC ................. B26D 7/18; B23B 47/43; A47L 7/00
See application file for complete search history.

(56) References Cited

U.S. PATENT DOCUMENTS

| | | |
|---|---|---|
| 3,368,341 A | 2/1968 | Goebel |
| 3,442,337 A | 5/1969 | Astrom |
| 3,744,082 A | 7/1973 | Marshall et al. |
| 3,815,171 A | 6/1974 | Carr et al. |
| 3,878,582 A | 4/1975 | Hukuba |
| 3,894,308 A | 7/1975 | Carr et al. |
| 3,895,407 A | 7/1975 | Parise |
| 4,192,104 A | 3/1980 | Patenaude |
| 4,360,947 A | 11/1982 | De Cosa et al. |
| 4,558,752 A | 12/1985 | Freund |
| 4,747,178 A | 5/1988 | Breitbach |
| 5,228,244 A | 7/1993 | Chu |
| 5,437,078 A | 8/1995 | Courcelles |
| 5,440,809 A | 8/1995 | Padilla |
| 5,779,402 A * | 7/1998 | Kameda ............... 408/56 |
| 5,833,524 A | 11/1998 | Satoh et al. |
| 6,017,400 A | 1/2000 | Clark et al. |
| 6,065,633 A | 5/2000 | Abbey |
| 6,079,078 A | 6/2000 | Byington |
| 6,514,131 B1 | 2/2003 | Reich et al. |
| 6,641,634 B2 | 11/2003 | Reich et al. |
| 6,854,937 B1 | 2/2005 | Weiss |

(Continued)

*Primary Examiner* — David Redding
(74) *Attorney, Agent, or Firm* — Lisa Foundation Patent Law Clinic (57) ABSTRACT

A system and method for capturing dust from power tool operation are disclosed. The system comprises a debris-collecting accessory that includes a body and a nose. The nose has an opening for a toolbit and at least one suction port that opens into an interior volume of the housing. The body has a second end configured to couple to a power tool. An exhaust tube attaches to the exterior surface of the body such that an interior volume of the exhaust tube connects to an interior volume of the housing. An exit passage is coupled to the exhaust tube and is configured to couple to a vacuum.

18 Claims, 7 Drawing Sheets

(56) References Cited

U.S. PATENT DOCUMENTS

| | | |
|---|---|---|
| 7,281,886 B2 | 10/2007 | Stoerig |
| 7,740,086 B2 | 6/2010 | Bleicher et al. |
| 7,784,137 B2 | 8/2010 | Knopow |
| 7,784,149 B2 | 8/2010 | Schwarz et al. |
| 7,797,794 B2 | 9/2010 | Bleicher et al. |
| 2006/0026790 A1 | 2/2006 | Consilvio |
| 2007/0028416 A1 | 2/2007 | Dunkel et al. |
| 2007/0193759 A1 | 8/2007 | Sweig |
| 2010/0242216 A1 | 9/2010 | MacNaughton |
| 2010/0243656 A1 | 9/2010 | Nazarian |
| 2011/0296644 A1 | 12/2011 | Grassman |

\* cited by examiner

SYSTEM AND METHOD FOR CAPTURING DUST FROM POWER TOOL OPERATION

CROSS-REFERENCE TO RELATED APPLICATIONS

This application is a continuation-in-part of and claims priority to U.S. patent application Ser. No. 13/086,334, titled 'System and method for capturing resultant dust from power tool operation,' and filed on Apr. 13, 2011 by Jack M. King, Jr.; and U.S. patent application Ser. No. 13/309,037, titled, "Vacuum device for capturing dust within a receptacle," filed on Dec. 1, 2011 by Jack M. King, Jr. The contents of the above mentioned applications are hereby incorporated by reference.

BACKGROUND

1. Field of the Invention

The present disclosure relates to power tool accessories, and more particularly, to power tool accessories for capturing dust and debris.

2. Description of Related Art

The removal of flooring tile is a dirty and time-consuming process. Power driven chisels are often employed to speed the removal of the tile and its backing adhesive material. However, this process results in a large amount of dust and debris that is ejected into the ambient air. A large amount of preparation time is needed in order to protect surrounding areas from being contaminated with dust. Additionally, the dust negatively affects the health of those in the area. Furthermore, environmental regulations in certain areas prohibit the escape of the removed dust into the atmosphere.

In order to combat the dust, many tools have been conceived of Various apparatuses include encasing the operating end of a power tool with a housing and attaching a vacuum to the housing. In the majority of these tools, the housing is cylindrical and has a single large opening through which the dust is captured. The current state of the art has several shortcomings. First of all, the location of the vacuum attachment in the prior art does not maximize the location and direction of air flow in order to capture the most dust. Second, the large opening does not allow the tool to reach certain places, such as in corners and underneath cabinets. Third, the durability of many products on the market is suspect. Fourth, the cylindrical shape of the operating end of the apparatuses does not provide a stable base on which to move the tool along the floor. Fifth, some of the products would often get clogged with pieces of debris. Therefore, a need arose for the present invention.

So as to reduce the complexity and length of the Detailed Specification, and to fully establish the state of the art in certain areas of technology, Applicant(s) herein expressly incorporate(s) by reference all of the following materials identified in each numbered paragraph below.

U.S. application Ser. No. 11/367,009 discloses a dust suppression boot for a percussive power tool attached to a vacuum source. The boot is comprised of a hollow body fitting over the operating end of a percussive power tool with a hollow arm designed to attach to a vacuum hose. One end of the boot is left open nearest the operating end of the power tool to suction dust into the hollow interior of the body of the boot. Dust is transferred into the arm, as its interior connects to the interior of the body of the boot, and then into a vacuum attached to the open end of the arm.

U.S. Pat. No. 3,442,337 discloses a pneumatic-eroding type tool useful for removing dust and particles from a work zone. The dust is taken away from the area near the pneumatic tool by means of an exhaust tube formed from a combination of exhaust air and a downstream fan.

U.S. Pat. No. 5,228,244 discloses a pneumatic tool including a rotor and a Venturi tube to collect dust. A hood is built over the operating portion of a power tool. The hood is designed to lie flush with the surface the power tool is operating upon. The interior of the hood is hollow and the interior space connects to a vacuum hose for the removal of dust captured by the hood.

U.S. Pat. No. 5,440,809 discloses a dust collection apparatus for high-speed grinders. A housing fits around the cutting element of a power tool and lies flush with the surface being cut to prevent dust from escaping. The cutting element of the power tool is contained within the housing. Dust that is captured by the housing is removed from the device through an attached vacuum tube.

U.S. Pat. No. 5,833,524 discloses a dust collection system for a power tool with a suction cavity. A shroud entirely encompasses a tool bit and fits closely to the surface being acted upon. The interior of the shroud is attached to a tube which is designed to be fitted to a vacuum hose. Dust is captured inside the shroud and siphoned into the tube and out of the device by the suction of the vacuum attached to the tube.

U.S. Pat. No. 6,079,078 discloses a chip and dust collection apparatus attached to a machine tool having a spindle and a cutter. A hollow hood is fitted over a cutting bit of a power tool and fits flush with the surface being operated upon. The hood has an articulated portion designed to provide flex and maintain contact between the hood and the surface being operated upon. Dust and debris is trapped inside the hood and suctioned out of the device through a connected vacuum hose.

U.S. Pat. No. 6,514,131 discloses a power tool having a dust suction device integrated into its housing. The hollow interior housing of the power tool itself is designed to fit flush with the surface being operated on. Dust is collected in this housing due to its close relation to the surface. Dust is transferred from this interior hollow volume by a suction device integrated into the tool through an opening which leads to a dust collection box which is also part of the tool itself. Dust is collected in the dust collection box which must be emptied when full.

U.S. Pat. No. 6,641,634 discloses a manual machine tool including a vacuum device situated in its housing. The housing of the machine tool itself has a hollow portion that fits flush with the surface being operated upon by the tool. Dust is trapped inside this hollow portion and may be ejected into an attached dust box through an ejection opening.

U.S. Pat. No. 6,854,937 discloses a dust attachment which is used with a spiral saw power tool. A hollow attachment is fitted over the operating end of a spiral saw power tool with an airtight attachment furthest away from the operating end of the power tool. The end closest to the operating end of the power tool is hollow and collects dust from the operating end of the power tool through the same opening which allows the operating end of the power tool to reach the surface being operated upon. The forward end of the attachment, through which the operating bit of the power tool protrudes, is flat in one continuous plane and only has the single opening. Dust is removed from this interior volume through a hollow arm, the interior of which connects to the hollow interior of the attachment, by the suction force of an attached vacuum hose.

U.S. Pat. No. 7,281,886 discloses a suction device that is used with a power drilling tool with an aeration device fixedly connected by a suction conduit with the suction head. A hollow housing is fitted to the exterior of a power tool and does not encase any of the body of the power tool. One end of the housing forms a suction head around the tool bit and draws dust into the hollow body of the housing. This suction end lies flush with the surface being operated upon and only encompasses a portion of the operating bit nearest the surface. Dust is drawn to the opposite end of the housing by an internal fan driven by an electric motor internal to the device. Dust is accumulated in the end of the device housing the fan and motor.

U.S. Pat. No. 7,740,086 discloses a suction device for a hammer drill having a receiving space which partially encloses a working tool. The suction device attaches over the operating end of a pick power tool. One end of the device attaches to the body of the power tool while the other end has a plurality of suction ports which contact the surface being operated upon. A portion of the device is articulated to provide flexibility to the body of the device, which is hollow, and to maintain contact between the device and the surface being operated upon. Dust is drawn into the hollow body of the device through the suction ports that contact the surface, and out of the device through a single hollow connection for a vacuum hose.

U.S. Pat. No. 7,797,794 discloses a suction device for a pick power tool with a vacuum source and a baffle wall. The device is hollow and has two ends, the first of which is coupled to the pick power tool, the second end is elastic and extends around the operating bit of the pick power tool. The second end maintains contact with the surface being operated upon through the elasticity of the second end. The first and second ends are separated by an interior baffle. The hollow chamber formed by the second end is connected to a hollow connection element which can be attached to a vacuum hose. Dust is drawn into the second end and ejected from the device through the hollow connection element into the vacuum hose.

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant will amend the specification to expressly recite the essential material that is incorporated by reference as allowed by the applicable rules.

BRIEF SUMMARY

According to some embodiments, a debris-collecting tool accessory comprises a housing comprising an interior passageway and an exit passage, the interior passageway fluidly communicating with the exit passage and configured to allow the shaft of a tool to pass through the interior passageway, the exit passage configured to couple with a negative pressure source, a nose coupled to the housing and comprising a toolbit opening configured to allow a toolbit to extend at least partially out of the toolbit opening, a first internal port coupled to a first side of the interior passageway proximal to the toolbit opening and a second internal port coupled to a second side of the interior passageway proximal to the toolbit opening, the first and second toolbit internal ports fluidly communicating with the exit passage, a suction port plate coupled to the housing and the nose, the suction port plate comprising a plurality of suction ports, the suction ports fluidly communicating with the exit passage.

Particular implementation of a debris-collecting tool accessory may include one or more of the following features and aspects. The nose further comprises a lip, a lower face, a nose wall, and an upper face that slopes upward from the lip such that a plane in which a surface of the upper face lies forms an acute angle with a plane in which a surface of the lower face lies, and the nose wall extends from the leading edge to the housing. The sloping effect and rounded edges of the nose, lip, upper face and nose wall allow debris to more easily slide along and glance off the debris-collecting tool. By limiting head on collisions with debris, which tend to stop forward movement, these designs increase the overall speed that tile and debris removal can be accomplished. The debris-collecting tool accessory further comprises a clamp coupled to the housing on a surface distal from the nose and comprising a back opening configured to allow at least a portion of the tool to pass through, wherein the clamp comprises a plurality of clamp vent holes that fluidly communicate with the exit passage and the interior passageway. The toolbit opening comprises a narrowing along its width to provide a fulcrum configured to allow a toolbit to pivot upon it. The toolbit opening comprises a plurality of crush points along its width configured to allow a toolbit to crush debris between a surface of the toolbit and a surface of one of the plurality of crush points. The suction ports are elliptical. The debris-collecting tool accessory comprises a removable flexible chip guard comprising a flexible base, a nose guard coupled to the front of the flexible base, and a plurality of fasteners that couple the guard to the debris-collecting tool accessory.

According to some embodiments, a debris-collecting tool accessory comprises a body comprising a toolbit opening and an exit passage, wherein the toolbit opening is configured to allow a toolbit to extend at least partially through the toolbit opening, and the exit passage is configured to couple with a negative pressure source, a first exhaust tube coupled to the body between the toolbit opening and the exit passage, a second exhaust tube coupled to the body between the toolbit opening and the exit passage, wherein the first and second exhaust tubes fluidly communicate with the exit passage, a first internal port coupled between a first side of the toolbit opening and the first exhaust tube, a second internal port coupled between a second side of the toolbit opening and the second exhaust tube, wherein the first and second internal ports fluidly communicate with the exit passage.

Particular implementations may include one or more of the following aspects. The debris-collecting tool accessory comprises a nose wherein the nose comprises a lip, a lower face, a nose wall, and an upper face that slopes upward from the lip such that a plane in which a surface of the upper face lies forms an acute angle with a plane in which a surface of the lower face lies, and the nose wall extends from the lip to a surface of the body. The debris-collecting tool accessory comprises a clamp coupled to the body on a surface distal from the toolbit opening and comprising a back opening configured to allow at least a portion of the tool to pass through, and wherein the clamp comprises a plurality of clamp vent holes that fluidly communicate with the exit passage. The toolbit opening comprises a narrowing along its width to provide a fulcrum configured to allow a toolbit to pivot upon it. The toolbit opening comprises a plurality of crush points along its width configured to allow a toolbit to crush debris between a surface of the toolbit and a surface of one of the plurality of crush points. The debris-collecting tool accessory comprises a suction port plate coupled to the housing and the nose, the top plate comprising a plurality of suction ports, and the suction ports fluidly communicating with the exit passage. The debris-collecting tool accessory comprises a removable flexible chip guard comprising a flexible base, a nose guard coupled to the front of the flexible base, and a plurality of fasteners that couple the guard to the debris-collecting tool accessory.

According to some embodiments a method of collecting debris using a debris-collecting accessory comprises attaching to a pneumatic tool, a debris-collecting accessory comprising a body comprising a toolbit opening and an exit passage, wherein the toolbit opening is configured to allow a toolbit of the pneumatic tool to extend at least partially through the toolbit opening, and the exit passage is configured to couple with a negative pressure source, a first exhaust tube coupled to the body between the toolbit opening and the exit passage, a second exhaust tube coupled to the body between the toolbit opening and the exit passage, wherein the first and second exhaust tube fluidly communicate with the exit passage, a first internal port coupled between a first side of the toolbit opening and the first exhaust tube, a second internal port coupled between a second side of the toolbit opening and the second exhaust tube, wherein the first and second internal ports fluidly communicate with the exit passage; attaching a negative-pressure source to the exit passage; and removing a tile adhered to a surface using the pneumatic tool.

Particular implementations may further comprise one or more of the following aspects. The debris-collecting accessory comprises a nose wherein the nose comprises a lip, a lower face, a nose wall, and an upper face that slopes upward from the lip such that a plane in which a surface of the upper face lies forms an acute angle with a plane in which a surface of the lower face lies, and the nose wall extends from the lip to a surface of the body. The toolbit opening comprises a narrowing along its width to provide a fulcrum configured to allow the toolbit to pivot upon it. The toolbit opening comprises a plurality of crush points along its width configured to allow the toolbit to crush debris between a surface of the toolbit and a surface of one of the plurality of crush points. The debris-collecting accessory comprises a top plate coupled to the housing and the nose, the top plate comprising a plurality of suction ports, and the suction ports fluidly communicating with the exit passage. The method comprises attaching to the debris-collecting accessory a removable flexible chip guard comprising a flexible base, a nose guard coupled to the front of the flexible base, and a plurality of fasteners that couple the guard to the debris-collecting tool accessory.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
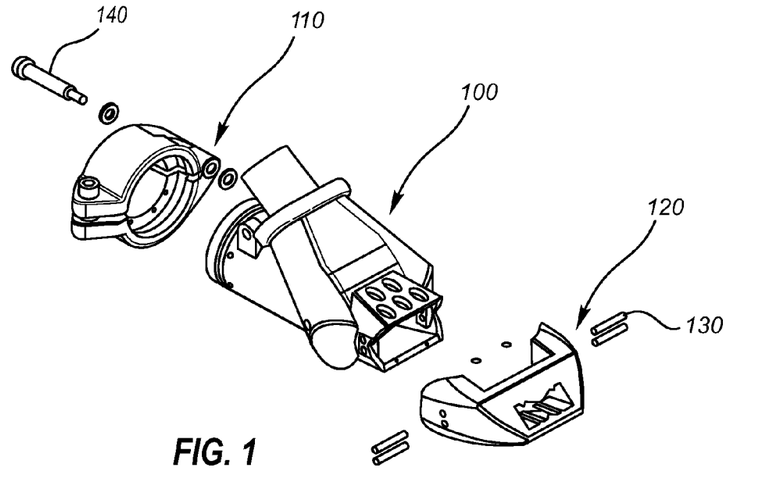
FIG. 1 depicts an exploded view of an embodiment of the debris-collecting accessory.

Referring to FIG. 1, one embodiment of the debris-collecting accessory comprises a nose 120, a body 100, a clamp 110, dowels 130, and a hinge bolt 140.

Figure 2:
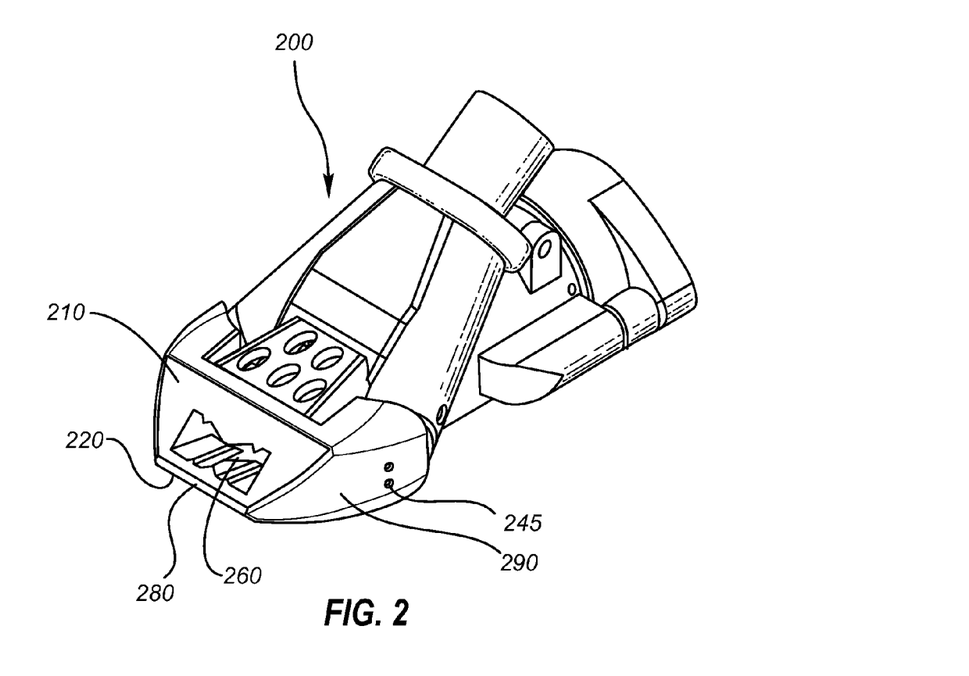
FIG. 2 depicts a perspective view of an embodiment of the debris-collecting accessory.

In some embodiments, the nose 120 may be coupled to the body 100 with dowels 130. The clamp 110 may couple the body 100 to a tool 780. An embodiment constructed of multiple pieces is shown in FIG. 1. The separate pieces may be coupled as shown in FIG. 2. The separate pieces may be coupled by welds, dowels, clamps, bolts, or the like. In some embodiments, the body 100, nose 120, clamp 110 or any combination of the structure may be comprised of one or more pieces.

Figure 3:
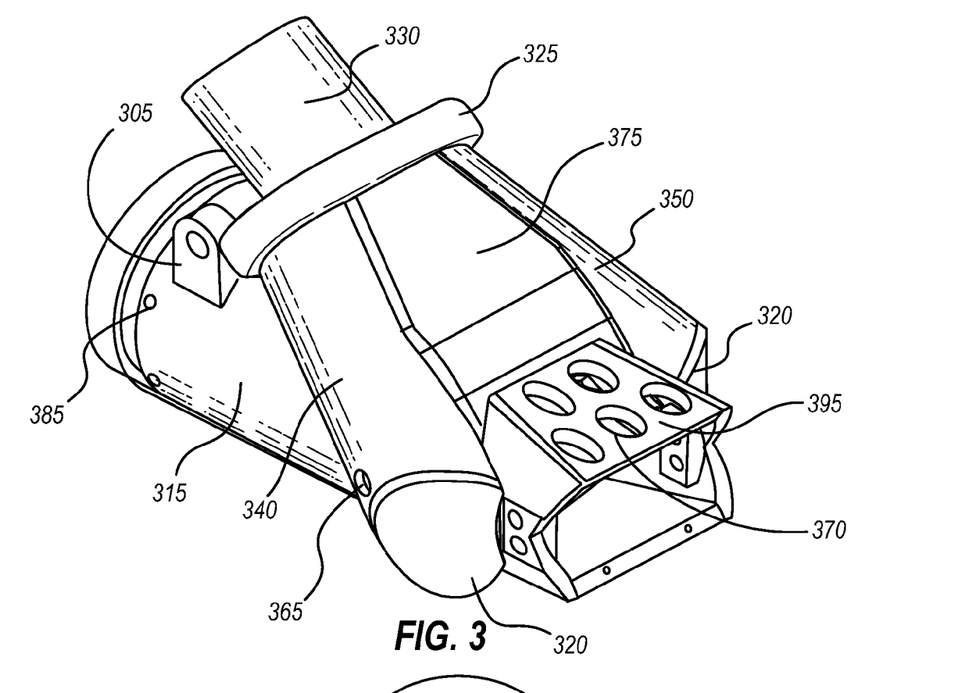
FIG. 3 depicts a perspective view of an embodiment of the debris-collecting accessory with the nose removed.

The body 100, in some embodiments, comprises a housing 315 (FIG. 3), a first exhaust tube 340, a second exhaust tube 350, a plurality of suction ports 370, a top plate 375, an exit passage 330, a coupler 325, a plurality of body dowel holes 355 (FIG. 5), a plurality of access ports 365, attachment tabs 305, suction port plate 395, and body vent holes 385. Dowels 130 may be used to couple the nose 120 to the body 100 by insertion through both the body dowel holes 355 and the nose dowel holes 245 (FIG. 2).

The nose 120 in some embodiments comprises a toolbit opening 260, nose dowel holes, 245, a plurality of nose walls 290, a lip 280, an upper face 210, and a lower face 220. In some embodiments, a toolbit opening 260 is located on the upper face 210. A lip 280 may be below the upper face 210 and defines a portion of the nose 120 where the upper face 210 and lower face 220 meet. A plurality of nose walls 290 may extend from the lip 280, upper face 210 and lower face 220. In some embodiments the nose walls 290 curve from the lip 280 back toward exhaust tubes 340 and 350.

In some embodiments, the first and second exhaust tubes 340 and 350 are coupled to the exit passage 330 with a coupler 325 so that the exhaust tubes 340 and 350 fluidly communicate with the exit passage 330. In some embodiments a negative pressure source (or vacuum), which is coupled to the exit passage 330, fluidly communicates the negative pressure to the first and second exhaust tubes 340 and 350. In some embodiments, the top plate 375 is coupled to the housing 315 between the first and second exhaust tubes 340 and 350. The top plate 375 may comprise a plurality of suction ports 370 that fluidly communicate with the exit passage 330. In other embodiments, the suction ports 370 are located on the suction port plate 395. In some embodiments the suction ports 370 fluidly communicate with the exit passage 330 through the first and second exhaust tubes 340 and 350. In some embodiments, the suction ports 370 are round. In some embodiments the suction ports 370 are elliptical, ovular, race-tracked-shaped, rectangular, or any other suitable shape that would allow debris collecting near the front of the debris-collecting accessory to be vacuumed through the suction ports 370. The suction ports may be modified depending on the substance that is being collected by the debris-collecting accessory, the size and shape of the interior passageway 530, the first and second internal ports 510 and 610, the first and second exhaust tubes 340 and 350, or any component or surface through which the debris to be collected will travel. These modifications may be made as one having skill in the art would readily see from these disclosures. In some embodiments, the suction ports 370 may be made larger to accommodate larger debris. In other embodiments, the suction ports 370 may be made smaller to prevent larger debris from entering. Suction ports that have an elliptical shape have the advantage of allowing debris that becomes stuck against the top plate 375 and/or in the suction ports 370 to become dislodged by the vibration of a tool coupled to the debris-collecting accessory and to, therefore, pass through the suction ports 370.

Access ports 365 in some embodiments provide an opening for access to an interior of the debris-collecting accessory. A user may insert a long skinny tool, such as a screwdriver, into the access ports 365 dislodge any debris that may have clogged the debris-collecting accessory. In some embodiments the access ports 365 provide an attachment point for a rubber guard 1100 (FIG. 11) or other accessory.

A toolbit opening 260 provides several functions. In some embodiments, the toolbit opening 260 is large enough for a toolbit 710 of a tool 780 to pass through. The toolbit opening 260 may fluidly communicate with an exit passage 330. When the toolbit 710 is used to chip material, such as floor tile or mortar, the toolbit opening 260 allows the toolbit 710 to function properly by not restricting the front-and-back motion of the toolbit 710. The toolbit opening 260 provides a route for floor tile, mortar pieces, and dust to be sucked into a vacuum source by fluid communication with the exit passage 330. This allows the removal of tile and mortar with a tool while maintaining a nearly dust-free environment.

Figure 4:
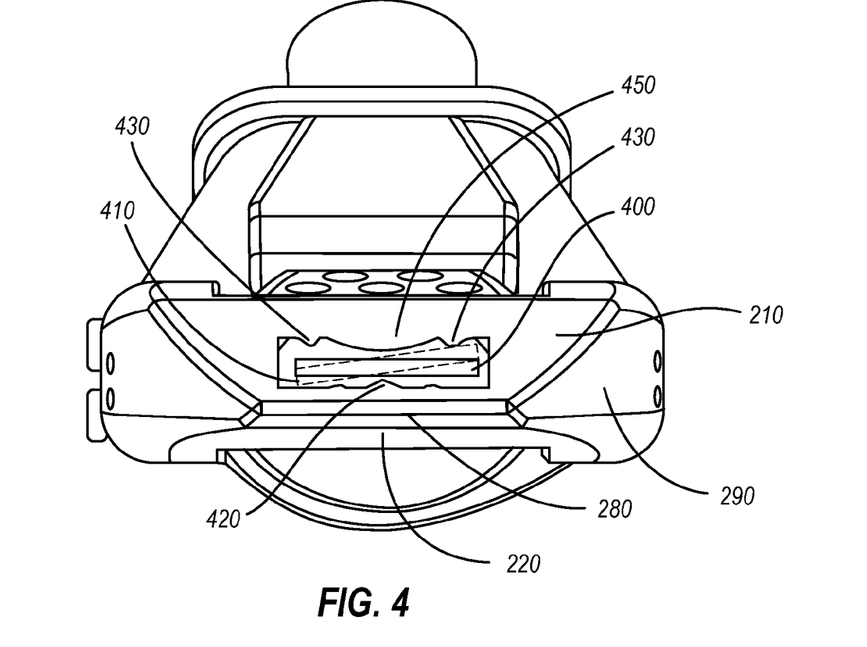
FIG. 4 depicts a front elevation view of an embodiment of the debris-collecting accessory.

A toolbit opening 260 may also comprise crush points (or teeth) 430, an upper pivot point 450, and a lower pivot point 420. A toolbit 710 vibrates rapidly in a toolbit opening 260. Therefore, a toolbit 710 may have a first position 400 (FIG. 4) and a second position 410. The rapid movement of a toolbit 710 causes the toolbit to pivot on a pivot point 420 which causes the toolbit 710 to rotate between at least a first position 400 and a second position 410. The rotation of the toolbit 710 allows dust and debris to be crushed against the crush points 430 by vertical movement of the toolbit 710. Also, the toolbit opening 260 may comprise crush points 430 to prevent larger debris entering the debris-collecting accessory. One having skill in the art would be able to modify the toolbit opening 260 from the present disclosure to adjust the size to allow larger or smaller particles to enter, and to adjust the size of the crush points 430 and the pivot points 450 and 420 to accommodate various sizes of toolbits 710 and the size of the debris to be collected.

Some embodiments of the debris-collecting accessory further comprise body vent holes 385. Body vent holes 385 may be located on a top portion of the housing 315 and proximate to the clamp 110. Any number of vent holes 385 may be used, and they may be located on the side or lower portion of the housing 315, or further from the clamp end of the housing 315. The vent holes 385 allow air to flow through the housing 315 in a direction from one end of the housing 315 toward the other end. This air flow prevents dust and debris from accumulating inside the housing 315. This keeps the dust and debris from interfering with any tool 780, such as a chipping hammer, which is coupled to an embodiment of the debris-collecting accessory, improving the functionality and lifetime of the tool 780. Additionally, the body vent holes 385 allow cool air to flow into the housing 315 to cool the tool 780 and the debris-collecting accessory 200.

Figure 5:
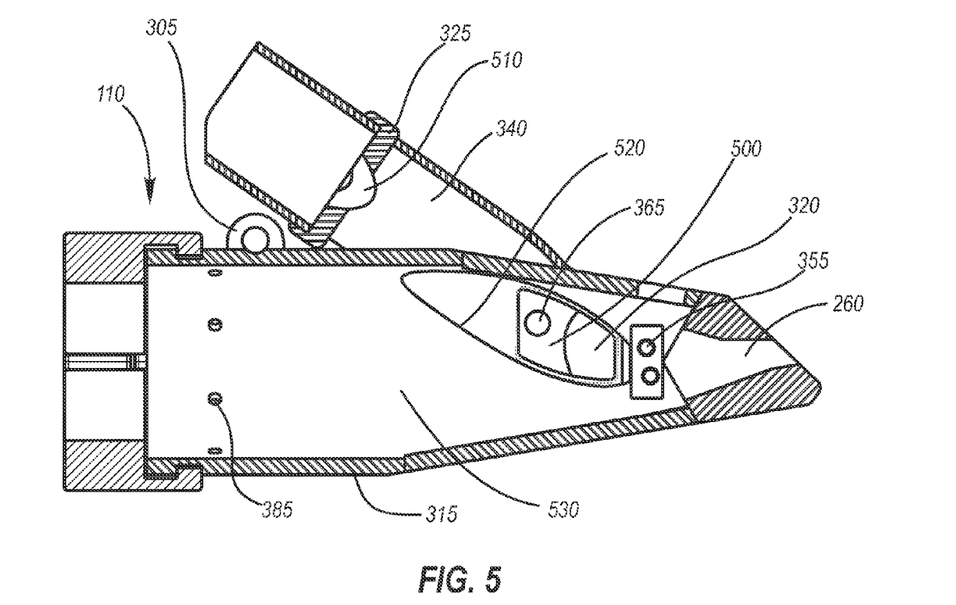
FIGS. 5-6 depict side elevation views of an embodiment of the debris-collecting accessory.
Figure 6:
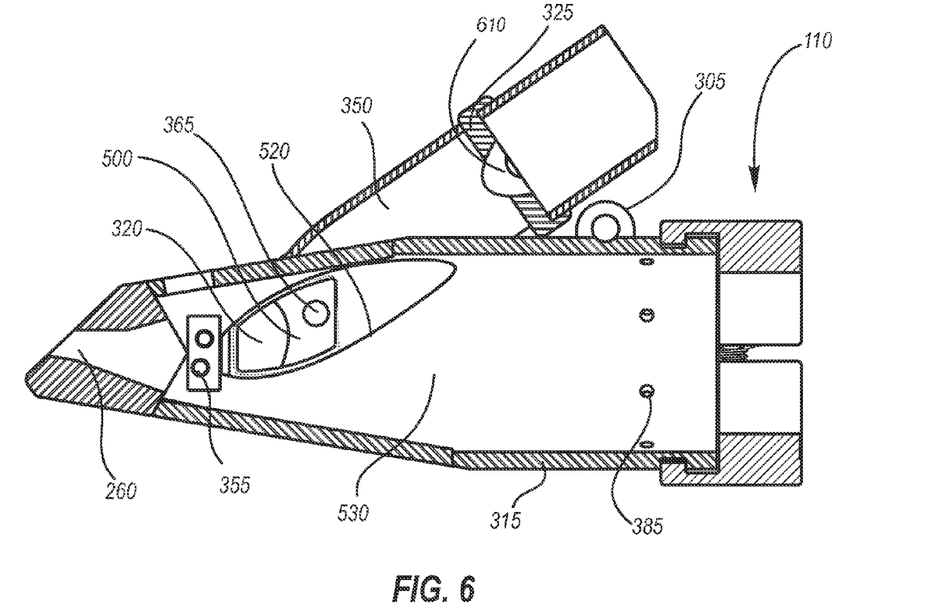

The housing 315 may comprise a housing cutout 520 (FIGS. 5 and 6). The housing cutout 520 may accommodate the curvature of an exhaust tube 340 and 350. The housing cutout 520 may allow the exhaust tubes 340 and 350 to be nestled closer to the housing 315 by allowing some of the exhaust tube to occupy some of the internal space of the housing 315. Alternatively, the exhaust tubes 340 and 350 may be machined to have a cutout to accommodate the curvature of the housing 315.

In some embodiments, the housing cutout 520 fluidly communicates with an opening of an exhaust tube 340 and 350. The exhaust tube 340 and 350 may comprise a cylindrical tube with two open ends. The cylinder may further comprise openings, cutouts, or machine work that allows the exhaust tubes 340 and 350 to couple with the housing 315, a coupler 325, each other, or other parts of the debris-collecting accessory. The exhaust tubes 340 and 350 may comprise an opening near the toolbit opening 260 that may be partially sealed with an endcap 320. The part of the opening of the exhaust tube 340 and 350 that is near the toolbit opening 260 not covered by the endcap 320 may fluidly communicate with the housing cutout 520. The area defined by the intersection of the housing cutout 520 and the opening of the first or second exhaust tube 340 or 350 may be an internal port 500. In this way, a negative pressure source that is coupled to the first and second exhaust tubes 340 and 350, will fluidly communicate through the exhaust tubes 340 and 350, the internal port 500, the housing cutout 520 and into the interior of the housing 315, or the interior passageway 530. In some embodiments, the access port 365 is aligned with the internal port 500 and the housing cutout 520 so that a screwdriver, or other long metal tool, may be inserted to dislodge material that may be stuck inside the debris-collecting accessory, the interior passageway 530, or the housing 315.

In some embodiments, the first and second exhaust tubes 340 and 350 comprise exhaust tube cutouts. An exhaust tube cutout may allow the exhaust tubes to be placed closer together by cutting off some of the end of the first and second exhaust tubes 340 and 350 where the tubes couple to the exit passage 330 and coupler 325. The exhaust tubes 340 and 350 fluidly communicate with each other and the exit passage 330 at this point to form a Y-shaped junction. By machining the various components, this junction can be made as small as possible and form a lighter, smaller, and more stream-lined debris-collecting accessory.

Figure 7:
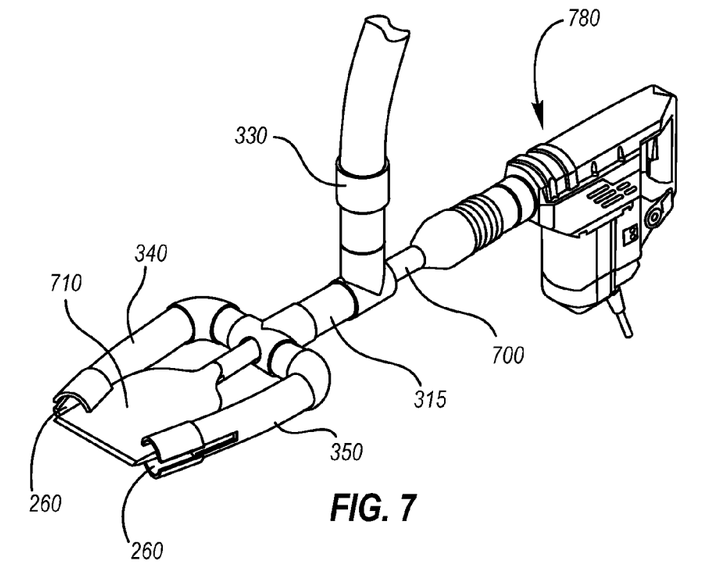
FIGS. 7-9 depict perspective views of embodiments of the debris-collecting accessory.
Figure 8:
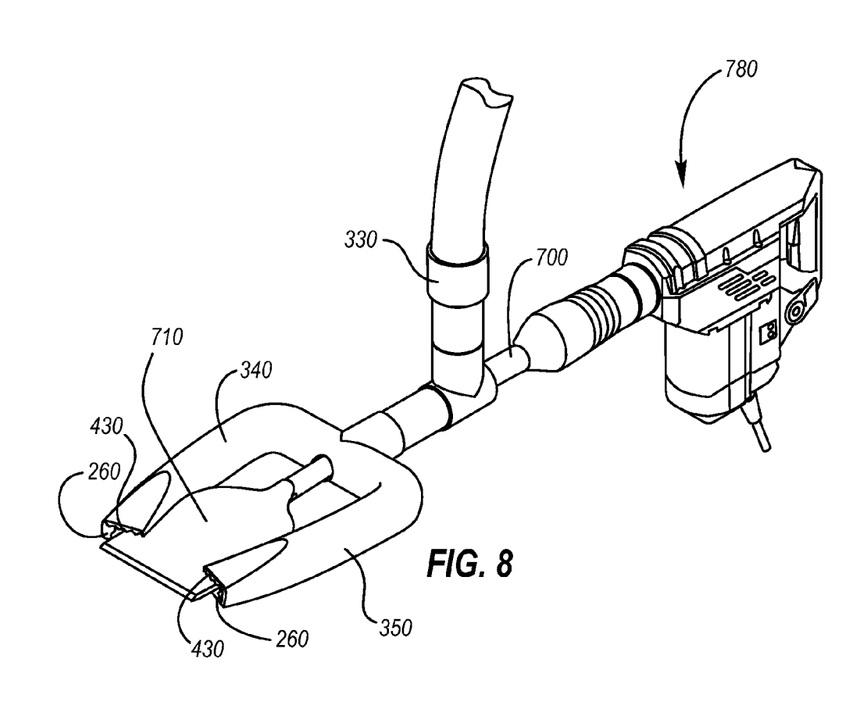
Figure 9:
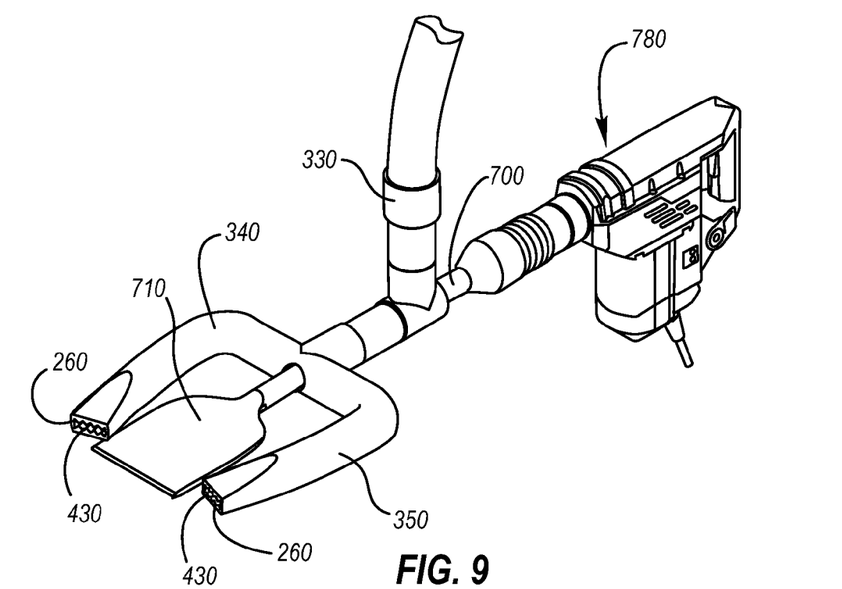

In further embodiments of the debris-collecting accessory, the debris-collecting accessory may comprise a plurality of toolbit openings 260 (FIGS. 7, 8, and 9). The toolbit opening 260 may be coupled to the first and second exhaust tube 340 and 350. The exhaust tubes 340 and 350 may couple to the front of the housing 315 and extend outward so that the exhaust tubes 340 and 350 run substantially parallel to the plane of the toolbit 710. An exit passage 330 may be coupled to the housing 315 and may extend perpendicular to the length of the housing 315. The debris-collecting accessory in some embodiments may couple directly to the shaft 700 of a tool 780, such as a chipping hammer or other pneumatic-style tool and the shaft 700 may pass through one end of the housing 315 and out through the other end.

The toolbit opening 260 on some embodiments may comprise a slot that extends the entire width of an exhaust tube 340 and 350 (FIG. 7). The toolbit 710 may extend partially or entirely across the width of these toolbit openings 260. In some embodiments, the toolbit opening 260 may comprise a slot that extends partially through an exhaust tube 340 and 350 (FIG. 8). The toolbit 710 may extend partially or entirely across the width of these types of toolbit openings 260. In further embodiments, the toolbit opening 260 may comprise a slot that is closed on both ends of the exhaust tube and only extends internally across the face of an exhaust tube 340 and 350 (FIG. 9). The toolbit 710 in these embodiments may be placed proximal to the toolbit opening 260 and not pass through them.

Figure 10:
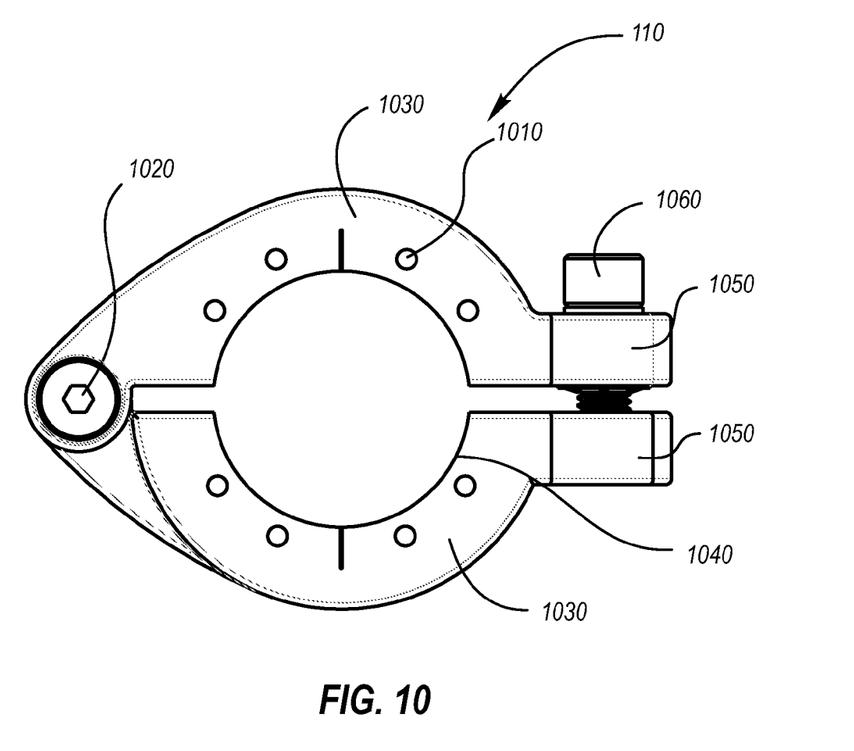
FIG. 10 depicts a back view of a clamp.

Referring to FIG. 10, a rear view of the clamp 110 is illustrated according to an embodiment of the debris-collecting accessory. The clamp 110 may comprise a hinge 1020, two collar members 1030, a hinge bolt 140, a bolt 1060, and neck portions 1050. The clamp 110 is designed to quickly attach and detach the debris-collecting accessory 200 from a tool 780. The clamp 110 may further comprise a nut which may be coupled to the neck portions 1050 such that the nut remains in place when the nut and bolt 1060 are not engaged. Alternatively, the nut may be a separate detachable piece. The bolt 1060 may thread into the nut, or alternatively the neck portions 1050 may be threaded such that the bolt 1060 engages with the neck portions 1050, and the nut is not required. The bolt 1060 may comprise a locking cam, in which the bolt 1060 requires no tools to tighten and loosen the clamp 110. In another embodiment, the bolt 1060 comprises a cotter pin to keep it in place. The bolt 1060 may further comprise a retaining member that couples to the bolt 1060 between the neck portions 1050 such that the bolt remains coupled to a neck portion 1050 when not engaged with the opposing neck portion 1050. An interior portion 1040 of the collar members 1030 may comprise an elastic material such as rubber in order to make a tight connection with the power tool. Alternatively, an interior portion 1040 of the collar members 1030 may be comprised of steel, machined to make a tight connection with the power tool. The clamp may further comprise clamp vent holes 1010. The clamp vent holes 1010 may be located on the collar members 1030 and have a similar function to the body vent holes 385.

Figure 11:
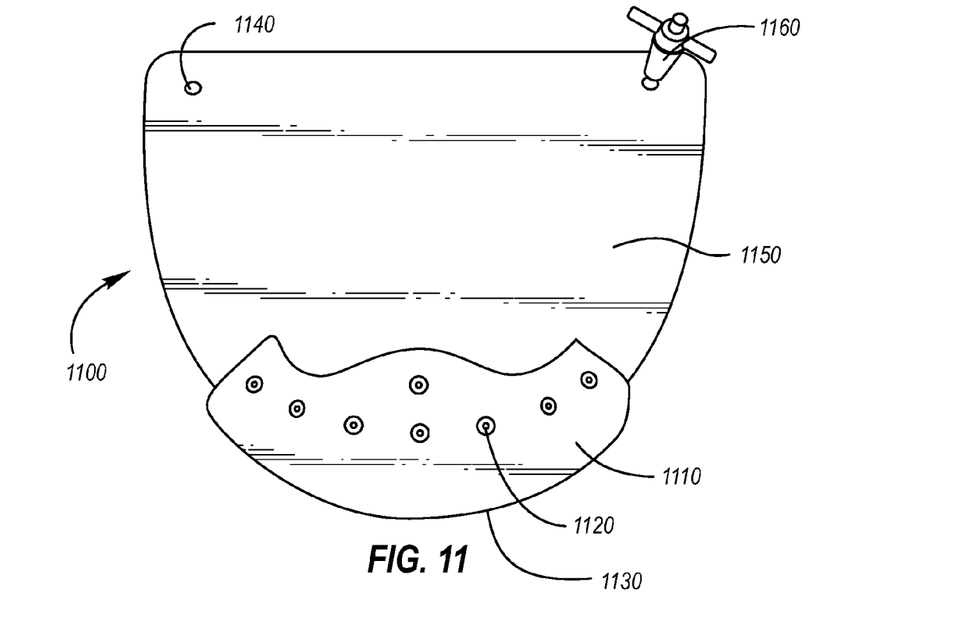
FIGS. 11-12 depict views of a rubber guard.

Some embodiments may comprise a flexible guard 1100 (FIG. 11). The flexible guard 1100 may couple to the debris-collecting accessory such that it covers the front of the debris-collecting accessory and prevents dust and debris from spreading through the air. The flexible guard 1100 may couple to the debris-collecting accessory by clips 1160 which may couple through attachment holes 1140 to attachment tabs 305 or access ports 365. The flexible guard 1100 may also be coupled to the debris-collecting accessory by snaps, quick-release clips, tabs, fasteners, or the like, as one having skill in the art would be aware from this disclosure.

Figure 12:
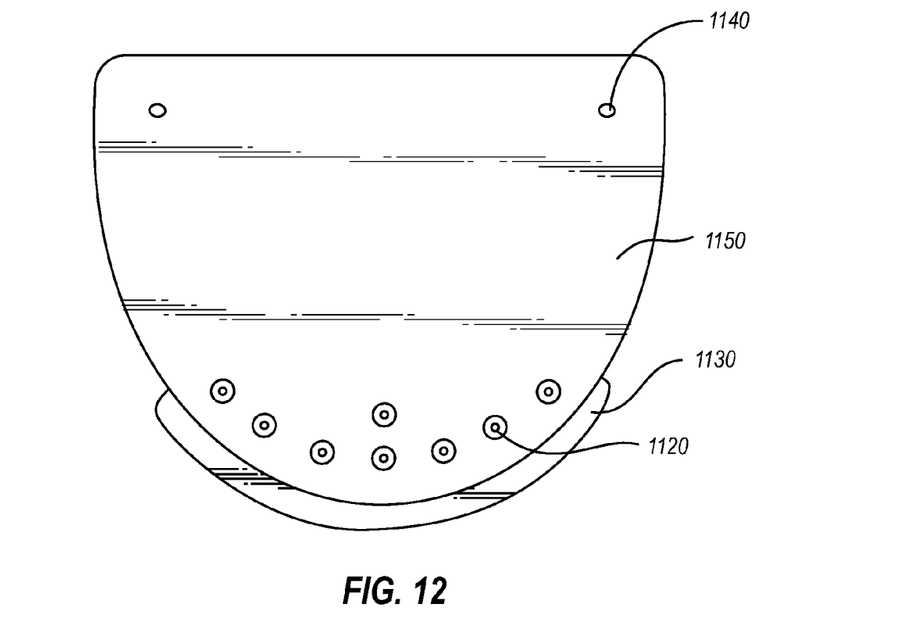

The flexible guard 1100 may comprise a nose guard 1110 coupled to a flexible base 1150 by a plurality of a fasteners 1120. The nose guard 1110 may comprise a leading edge 1130 which may add durability and reinforcement to the flexible base 1150. The nose guard 1110 may also function as a handle that allows the flexible guard 1100 to be pulled backward to allow viewing of the toolbit 710 underneath for more precise work or to work the debris-collecting accessory into a smaller space.

Figure 13:
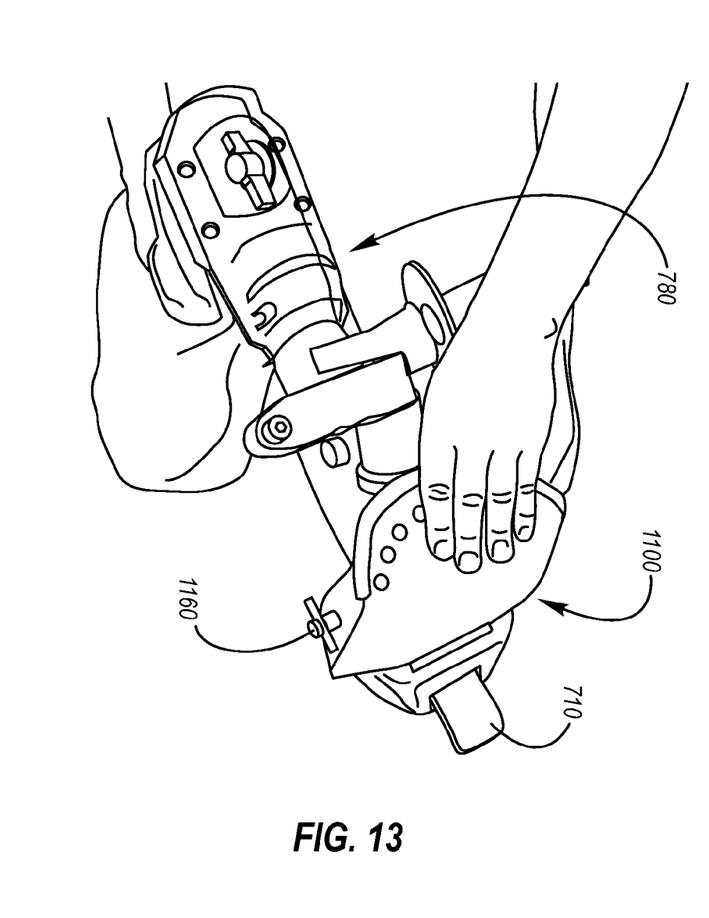
FIGS. 13-14 depict views of a chipping hammer coupled to a debris-collecting accessory and a rubber guard.
Figure 14:
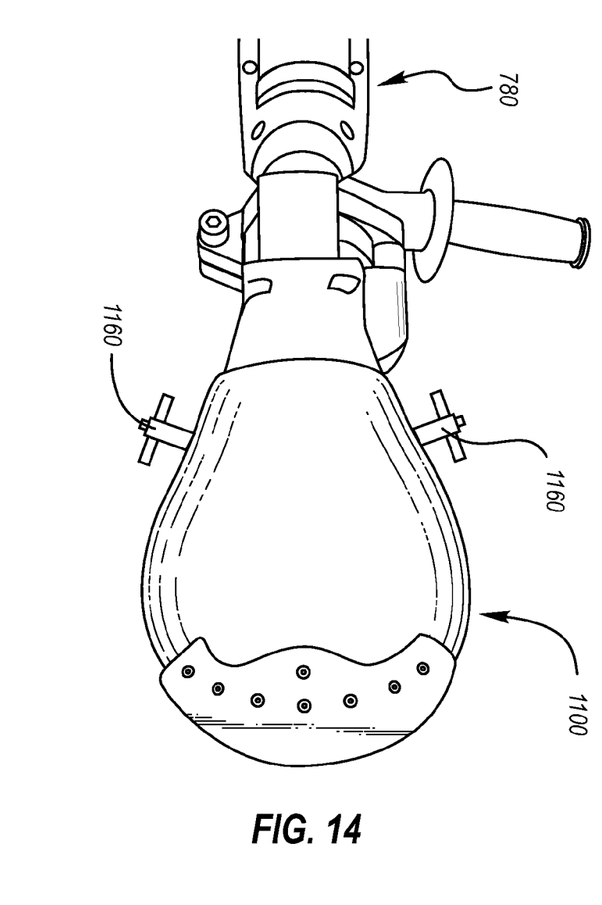

Referring to FIG. 13 and FIG. 14, a top and side view of the debris-collecting accessory 200 coupled to a tool 780, such as a chipping hammer are illustrated. The clamp 110 couples securely to the body of the tool 780. The debris-collecting accessory 200 may also be coupled to many other types of power tools including, but not limited to drills, hammer drills, grinders, sanders, dremmels, power saws, or jackhammers.

In some embodiments, the vacuum hose may fit around an exterior of the exit passage 330, or fit inside the exit passage 330, or couple as one of ordinary skill in the art would understand from this disclosure.

The various components may be coupled by any method known in the art. In one embodiment, where the debris-collecting accessory 200 is comprised primarily of steel or aluminum, the components may be welded together. Alternatively, they may be bolted, riveted, screwed, glued, or attached by any other method. In some embodiments, some components may comprise plastic and the components may be clamped together. In other embodiments, the components may be manufactured with a CNC machine. The components may also be case hardened or heat-treated to, for example, maximize their durability.

I claim:

1. A debris-collecting tool accessory comprising:
   a housing comprising an interior passageway and an exit passage,
   the interior passageway fluidly communicating with the exit passage and configured to allow a shaft of a tool to pass through the interior passageway,
   the exit passage configured to couple with a negative pressure source;
   a nose coupled to the housing and comprising a toolbit opening configured to allow a toolbit to extend at least partially out of the toolbit opening;
   a first internal port coupled to a first side of the interior passageway proximal to the toolbit opening and a second internal port coupled to a second side of the interior passageway proximal to the toolbit opening, the first and second toolbit internal ports fluidly communicating with the exit passage; and
   a suction port plate coupled to the housing and the nose, the suction port plate comprising a plurality of suction ports, the suction ports fluidly communicating with the exit passage.

2. The debris-collecting tool accessory of claim 1, wherein the nose further comprises a lip, a lower face, a nose wall, and an upper face that slopes upward from the lip such that a plane in which a surface of the upper face lies forms an acute angle with a plane in which a surface of the lower face lies, and the nose wall extends from the leading edge to the housing.

3. The debris-collecting tool accessory of claim 1, further comprising a clamp coupled to the housing on a surface distal from the nose and comprising a back opening configured to allow at least a portion of the tool to pass through, wherein the clamp comprises a plurality of clamp vent holes that fluidly communicate with the exit passage and the interior passageway.

4. The debris-collecting tool accessory of claim 1, wherein the toolbit opening comprises a narrowing along its width to provide a fulcrum configured to allow a toolbit to pivot upon it.

5. The debris-collecting tool accessory of claim 1, wherein the toolbit opening comprises a plurality of crush points along its width configured to allow a toolbit to crush debris between a surface of the toolbit and a surface of one of the plurality of crush points.

6. The debris-collecting tool accessory of claim 1, wherein the suction ports are elliptical.

7. The debris-collecting tool accessory of claim 1 further comprising a removable flexible chip guard comprising:
   a flexible base;
   a nose guard coupled to the front of the flexible base; and
   a plurality of fasteners that couple the guard to the debris-collecting tool accessory.

8. A debris-collecting tool accessory, comprising:
   a housing comprising a toolbit opening and an exit passage, wherein the toolbit opening is configured to allow a toolbit to extend at least partially through the toolbit opening, and the exit passage is configured to couple with a negative pressure source;
   a first exhaust tube coupled to the housing between the toolbit opening and the exit passage,
   a second exhaust tube coupled to the housing between the toolbit opening and the exit passage, wherein the first and second exhaust tubes fluidly communicate with the exit passage;
   a first internal port coupled between a first side of the toolbit opening and the first exhaust tube;
   a second internal port coupled between a second side of the toolbit opening and the second exhaust tube, wherein the first and second internal ports fluidly communicate with the exit passage; and
   a nose coupled to the housing, wherein the nose comprises a lip, a lower face, a nose wall, and an upper face that slopes upward from the lip such that a plane in which a surface of the upper face lies forms an acute angle with a plane in which a surface of the lower face lies, and the nose wall extends from the lip to a surface of the housing.

9. The debris-collecting tool accessory of claim 8, further comprising a clamp coupled to the housing on a surface distal from the toolbit opening and comprising a back opening configured to allow at least a portion of a tool to pass through, and wherein the clamp comprises a plurality of clamp vent holes that fluidly communicate with the exit passage.

10. The debris-collecting tool accessory of claim 8, wherein the toolbit opening comprises a narrowing along its width to provide a fulcrum configured to allow a toolbit to pivot upon it.

11. The debris-collecting tool accessory of claim 8, wherein the toolbit opening comprises a plurality of crush points along its width configured to allow a toolbit to crush debris between a surface of the toolbit and a surface of one of the plurality of crush points.

12. The debris-collecting tool accessory of claim 8, further comprising a suction port plate coupled to the housing and the nose, a top plate comprising a plurality of suction ports, and the suction ports fluidly communicating with the exit passage.

13. The debris-collecting tool accessory of claim 12, further comprising a removable flexible chip guard comprising:
   a flexible base;
   a nose guard coupled to the front of the flexible base; and
   a plurality of fasteners that couple the guard to the debris-collecting tool accessory.

14. A method of collecting debris using a debris-collecting accessory, the method comprising:
   attaching to a pneumatic tool, a debris-collecting accessory comprising a body and a nose:
      the housing comprises a toolbit opening and an exit passage, wherein the toolbit opening is configured to allow a toolbit of the pneumatic tool to extend at least partially through the toolbit opening, and the exit passage is configured to couple with a negative pressure source,
      a first exhaust tube coupled to the housing between the toolbit opening and the exit passage,
      a second exhaust tube coupled to the housing between the toolbit opening and the exit passage, wherein the first and second exhaust tube fluidly communicate with the exit passage,
      a first internal port coupled between a first side of the toolbit opening and the first exhaust tube,
      a second internal port coupled between a second side of the toolbit opening and the second exhaust tube, wherein the first and second internal ports fluidly communicate with the exit passage;
      a nose, wherein the nose comprises a lip, a lower face, a nose wall, and an upper face that slopes upward from the lip such that a plane in which a surface of the upper face lies forms an acute angle with a plane in which a surface of the lower face lies, and the nose wall extends from the lip to a surface of the housing;

attaching a negative-pressure source to the exit passage; and removing a tile adhered to a surface using the pneumatic tool.

15. The method of claim 14, wherein the toolbit opening further comprises a narrowing along its width to provide a fulcrum configured to allow the toolbit to pivot upon it.

16. The method of claim 14, wherein the toolbit opening comprises a plurality of crush points along its width configured to allow the toolbit to crush debris between a surface of the toolbit and a surface of one of the plurality of crush points.

17. The method of claim 14, wherein the debris-collecting accessory further comprises a top plate coupled to the housing and the nose, the top plate comprising a plurality of suction ports, and the suction ports fluidly communicating with the exit passage.

18. The method of claim 14 further comprising:

attaching to the debris-collecting accessory a removable flexible chip guard comprising: a flexible base, a nose guard coupled to the front of the flexible base, and a plurality of fasteners that couple the guard to the debris-collecting tool accessory.

\* \* \* \* \*